United States Patent

[11] 3,597,054

| [72] | Inventor | Peter McGowin Winter<br>4927 Jamestown Road, Washington, D.C. 20016 |
|---|---|---|
| [21] | Appl. No. | 885,675 |
| [22] | Filed | Dec. 17, 1969 |
| [45] | Patented | Aug. 3, 1971 |

[54] ULTRAVIOLET WARNING SPECTACLES
5 Claims, 4 Drawing Figs.

[52] U.S. Cl. .................................................. 351/158,
250/83 CD, 351/44
[51] Int. Cl. .................................................. G02c 1/00,
G01t 1/02
[50] Field of Search .......................................... 351/44, 41,
158; 350/1, 2; 250/83 CD

[56] References Cited
UNITED STATES PATENTS

| 2,790,910 | 4/1957 | Cameron | 351/44 X |
| 3,194,963 | 7/1965 | McKee | 250/83 CD |

Primary Examiner—David Schonberg
Assistant Examiner—John W. Leonard
Attorney—Bacon & Thomas ABSTRACT: A pair of spectacle is provided with one or more bodies or chips of material that respond to ultraviolet radiation to produce different visible effects depending upon the ultraviolet intensity. The bodies are mounted outside the normal field of view of the wearer but within the field of his peripheral vision so that the wearer may constantly monitor his exposure to ultraviolet and determine when it approaches a level to which he is unduly sensitive.

INVENTOR.
PETER M. WINTER
BY
Bacon & Thomas
ATTORNEYS

ULTRAVIOLET WARNING SPECTACLES

BACKGROUND OF THE INVENTION

This invention is in the field of indicators for ultraviolet radiation intensity.

Many persons must be careful to avoid undue exposure to ultraviolet radiation since they are highly sensitive and suffer from acute sunburn. Ultraviolet intensity indicators are known but they usually involve complicated electronic circuitry and/or bulky sensing devices and are obviously unsuited for the average individual who wishes to constantly monitor the ultraviolet radiation intensity to which he is being exposed.

SUMMARY OF THE INVENTION

The present invention comprises positioning one or more small bodies or chips of material that give different visible effects in response to different intensities of ultraviolet radiation. The bodies are mounted on some convenient portion of the wearer's apparel or accessories where it can be viewed as desired to keep the wearer apprised of the danger of sunburn to which he may be exposed. The description is specifically directed to provision of such indicating devices on a pair of spectacles but it is to be understood that they may be provided on other apparel, convenient to observe, such as the visor of a golf or other cap or even on a readily observable portion of the wearer's clothing.

DESCRIPTION OF THE PREFERRED EMBODIMENTS

Figure 1:
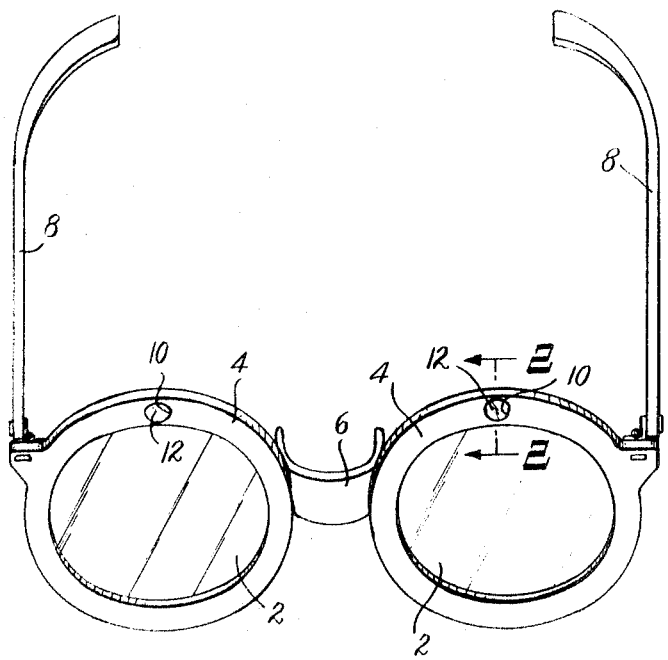
FIG. 1 is a perspective view of a pair of spectacles embodying the present invention.

In Figure 1, there is shown a pair of spectacles comprising lenses 2, lens frames 4, bridge 6, and bows or temples 8. While the description herein refers to spectacles it is to be understood that the term encompasses prescription ground spectacles or any pair of sunglasses or the like.

Figure 2:
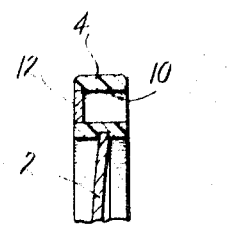
FIG. 2 is an enlarged fragmentary sectional view taken on the line 2-2 of FIG. 1.

As shown in FIGS. 1 and 2, the lens frames are each provided with an opening 10 therethrough, outwardly of the outer periphery of the lenses 2. The openings 10 extend from front to back through the lens frames and have positioned therein bodies 12 of material to be further described later. The bodies 12 in the respective openings 10 each respond to ultraviolet radiation to produce a visible effect, that is, visible light, but each body 12 is so selected that it produces visible light of an intensity different from that produced by another body 12 under the same exposure to ultraviolet radiation. Thus, when the ultraviolet intensity is sufficient to cause a visible light output from one of the bodies 12, the other will not respond in a visible manner and that will indicate to the wearer that the ultraviolet radiation intensity has reached a predetermined level but has not exceeded a predetermined higher level. That predetermined higher level is known to have been exceeded, however, when visible light is apparent through the other body 12.

As contemplated, the bodies 12 are positioned outside the normal field of view of the wearer of the spectacles but within range of his peripheral vision so that by conscious effort the wearer can observe the bodies 12 whenever he desires to monitor his exposure to ultraviolet.

Figure 3:
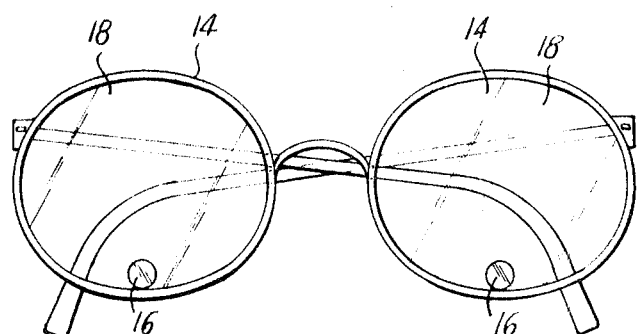
FIG. 3 is a front view of a further modified form of the invention.

Figure 3 shows the invention adapted to a pair of spectacles or sunglasses having thin lens frames 14, of insufficient dimension to accommodate the indicator bodies described as being positioned in the openings 10 in FIGS. 1 and 2. Such spectacles, however, may have the ultraviolet responsive bodies 16 mounted thereon within the exposed area of the lenses 18. These bodies may either be cemented to the outer front face of the lenses or may be positioned in openings cut through the lenses, as desired, but are to be mounted near the periphery of the lenses. It is contemplated that the body 16 be of the nature already described with reference to FIG. 1, functioning in the same manner.

Figure 4:
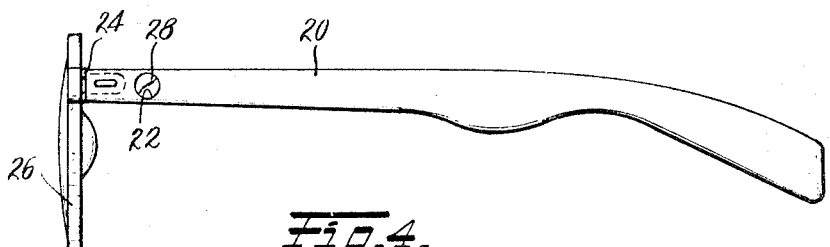
FIG. 4 is a diagrammatic illustration of a further embodiment.

FIG. 4 illustrates a further embodiment wherein bow or temple members 20 are provided with openings 22 therethrough adjacent the hinge 24 by which the bows are secured to lens frames 26. Ultraviolet responsive bodies 28 are positioned in the openings 22 and function in the same manner as described with reference to FIG. 1.

In all forms of the invention it is to be noted that the position of the ultraviolet responsive bodies is outside the normal field of view of the wearer but within range of his peripheral vision. Thus, they will not normally distract the wearer's attention during normal viewing of a scene but the wearer can consciously direct his attention thereto for monitoring purposes.

The description thus far relates to the position of only two responsive bodies but it is to be understood that, in some cases, a single body will suffice and in other cases more than two may be desired. As previously stated, the ultraviolet responsive indicator bodies may also be provided on other portions of apparel, such as the visor of a cap or any other item worn by a person but will be placed thereon so that the wearer may readily view ambient radiation therethrough when he desires to monitor his exposure.

Many materials are known and available, which are suitable for applicant's purposes. For example, materials transparent to ultraviolet radiation may be provided with a layer of fluorescent material thereon, which material fluoresces when exposed to ultraviolet. Such materials are shown and described in the patents to Wilson 2,128,110, Porter et al. 2,200,853, Rosett 2,401,191 and Walsh 3,427,489. It is contemplated that where a plurality of such bodies are employed as herein described suitable ultraviolet filters will be provided for each, each filter being of different transparency to ultraviolet so that each phosphor will emit visible light only when the ultraviolet intensity is sufficient to pass through the filter in sufficient intensity to activate the phosphor. Thus, an indicator device can be produced to indicate a plurality of ranges of ambient ultraviolet intensity.

The patent to Urbach 2,748,289 discloses a nonlinear phosphor device, different portions of which respond differently to ultraviolet radiation. Such a material may be employed as a single body or chip of material in accordance with applicant's invention and thus comparison between two or more different bodies is not necessary.

The patent to Barstow et al. 3,152,215 discloses a photochromic material which changes color and intensity on exposure to ultraviolet light. Clearly, such material as described in this patent may also be used in the practice of applicant's invention.

While a limited number of specific embodiments of the invention are shown and described, the same are merely illustrative of the principles involved and other modifications may be resorted to.

I claim:

1. In a pair of spectacles having lenses and bow members: at least one body of material responsive to ultraviolet light to produce different visible indications in response to different intensities of ultraviolet light, and means mounting said body on said spectacles adjacent but outside the normally used field of view through said lenses, whereby to indicate to the wearer of said spectacles the approximate range of intensity of ultraviolet radiation to which he is being exposed.

2. A pair of spectacles as defined in claim 1 wherein said body is mounted on said spectacles within the peripheral vision field of the wearer.

3. A pair of spectacles as defined in claim 1 wherein said spectacles include a frame member around said lenses, an opening through a frame member from front to back thereof, said body being mounted within said opening, the exposed including A pair of spectacles as defined in claim 1 wherein said body is mounted within the exposed area of a lens but adjacent the periphery thereof.

5. A pair of spectacles as defined in claim 1 including a plurality of said bodies mounted on said spectacles, each of said bodies producing different visible indications in response to the same intensity of ultraviolet light.